June 30, 1970    C. M. WERT    3,517,396
CUSHION TOILET SEAT STRUCTURE
Original Filed Aug. 20, 1964    2 Sheets-Sheet 1
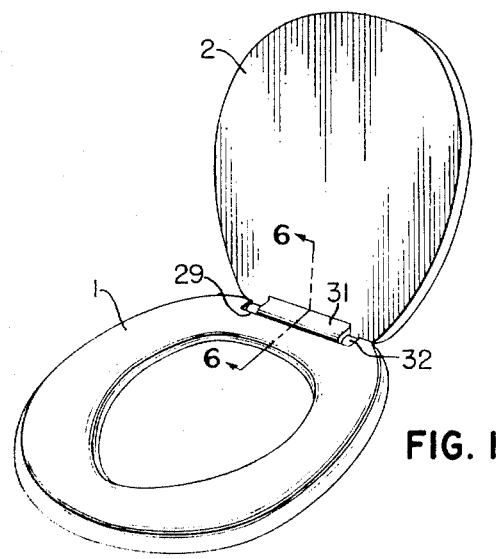
FIG. 1
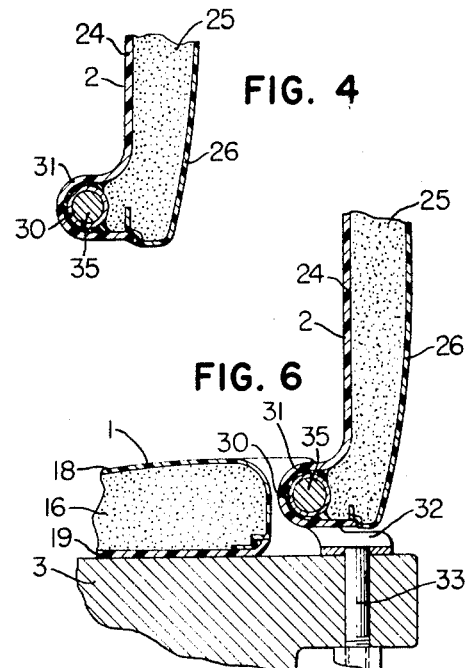
FIG. 4
FIG. 6
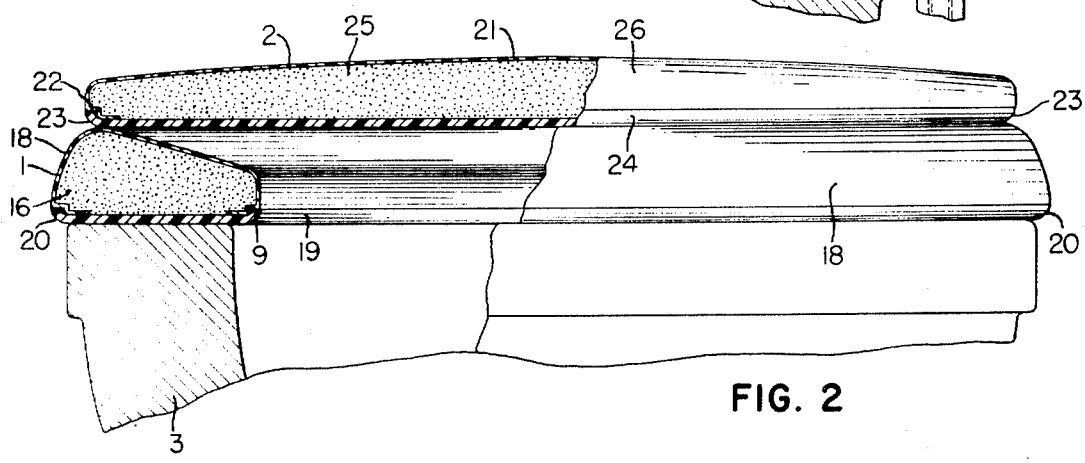
FIG. 2
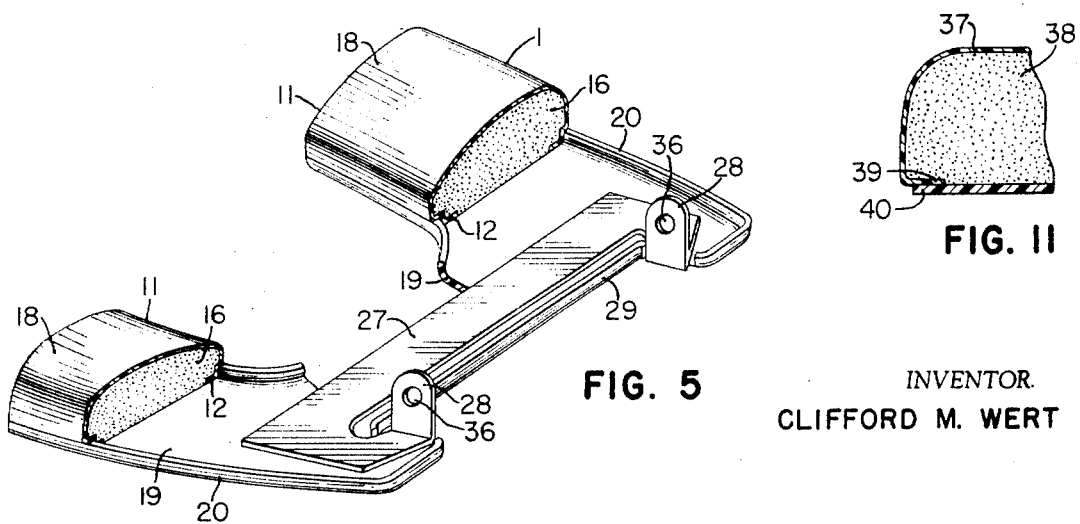
FIG. 5    FIG. 11
INVENTOR.
CLIFFORD M. WERT June 30, 1970    C. M. WERT    3,517,396
CUSHION TOILET SEAT STRUCTURE
Original Filed Aug. 20, 1964    2 Sheets-Sheet 2

INVENTOR.
CLIFFORD M. WERT

United States Patent Office 3,517,396
Patented June 30, 1970

3,517,396
CUSHION TOILET SEAT STRUCTURE
Clifford M. Wert, Akron, Ohio, assignor to The Goodyear Tire & Rubber Company, Akron, Ohio, a corporation of Ohio
Original application Aug. 20, 1964, Ser. No. 390,933, now Patent No. 3,379,800, dated Apr. 23, 1968. Divided and this application Nov. 6, 1967, Ser. No. 705,591
Int. Cl. A47k 13/00
U.S. Cl. 4—234                                        4 Claims

ABSTRACT OF THE DISCLOSURE

This invention relates to covered cushioned toilet seats and the like. More specifically the invention is directed to a toilet seat or a cushioned element wherein at least a portion of the surface is covered by a relatively impervious skin and the cushioning material is a foam.

CROSS-REFERENCE TO RELATED APPLICATION

This application is a division of application Ser. No. 390,933, filed Aug. 20, 1964, now Pat. No. 3,379,800.

BACKGROUND OF THE INVENTION

In the manufacture of such items as cushioned toilet seats, the usual practice has been to form the skin or covering material into the approximate final shape. The shaped skin is then supported in a mold and a charge of foam is placed then in the interior prior to closing the mold. The material then foams to fill the mold and in many instances overflows or flows out around the edge portions of the skin. This condition necessitates trimming, cutting or otherwise removing this overflow which is not only time consuming but difficult to accomplish satisfactorily. The method disclosed by this invention causes the formed skin to create its own seal against the mold to effect a seal by the skin to prevent such overflow so as to confine the foam within the desired areas.

In the present day variety of consumer products, particularly the home furnishing and automotive lines, many cushioned portions or sections are used to provide not only comfort but safety, pleasing appearance, predetermined contours, etc. Many such items are relatively difficult to fabricate due to the complicated contours which introduce problems in getting an acceptable covering on the item. If the covering is preformed then filled with foam cushioning material, the usual overflow of foam is difficult to remove and consumes considerable time as well. By using the method of this invention, many of these items may be formed as a complete and integral unit so that it is only necessary to assemble them into the product.

This method has been found particularly suitable for the manufacture of a new and novel cushioned toilet seat. There have been many types and constructions proposed in the past for such seats but none are commercially available. It is believed that one of the deficiencies of the previous seats has been in being able to commercially produce an acceptable product, both from an appearance standpoint and service life. With the relatively recent vast improvements in materials and manufacturing techniques, it is now possible to produce a product that is not only very durable but is very attractive in appearance. As a result, any desired decorative effect with respect to colors, surface texture, pattern, etc. may be readily attained.

By making the seat of non-metallic materials such as plastics or copolymers of rubber or rubber-like materials or combinations thereof, a seat is practically unbreakable and also is much more quiet when opened or closed as well as much more comfortable to the user. It is, therefore, an object of this invention to provide a toilet seat which is of attractive appearance and can be furnished to fit in a wide variety of decorative schemes.

A second object of this invention is to provide a method for manufacturing items having an impervious skin covering foamed cushioning material.

A further object of the invention is to provide a method for manufacturing such items which eliminates or minimizes any overflow of the foam during the foaming operation.

Another object of the invention is to provide a seat that has an excellent service life.

A still further object of this invention is to provide a seat which is sanitary and easily maintained so.

Other objects and advantages of this invention will become apparent hereinafter as the description thereof proceeds, the novel features, arrangements and combinations being clearly pointed out in the specification as well as the claims thereunto appended.

In the drawings:

FIG. 1 is a perspective view of a seat and lid embodying the invention;

FIG. 2 is a partial section of the seat and lid in position on a toilet bowl;

FIG. 4 is a fragmentary section of the lid showing the hinge structure;

FIG. 5 is a broken away partial section of the seat showing the hinge structure;

FIG. 6 is a section taken on 6—6 of FIG. 1;

FIG. 11 is a partial cross-section of another form of the invention.

DESCRIPTION OF THE INVENTION

Figure 7:
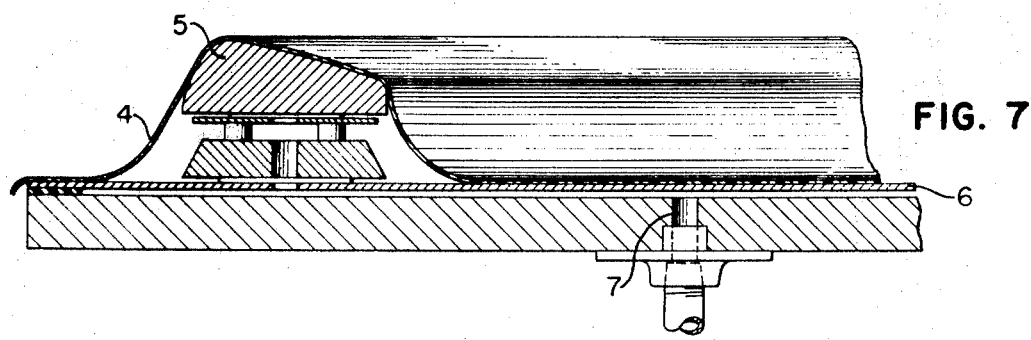
FIGS. 7, 8 and 9 are partial sections of steps in manufacturing a part of the seat structure.

One of the specific uses for which the invention is particularly suitable is a toilet seat 1 and cover 2 hinged together to provide selective raising and lowering as illustrated. In FIG. 2, the relative position of lid 1 and seat 2 in the closed position on a toilet bowl 3 is shown with the particular peripheral configuration of seat 1 and lid 2 substantially conforming to that of bowl 3 to provide a pleasing appearance. The peripheral configuration and cross-sectional contour may be varied to suit the particular bowl shape and to provide the desired aesthetic properties.

As shown, seat 1 rests flush against the surface of bowl 3 and lid 2 rests flush on the surface of seat 1 when the seat and lid are closed. In substantially each of the present day seats and lids, bumpers are provided on both the lid and seat to prevent flush contact to cushion and somewhat reduce the noise in the event either or both are dropped. By providing a flush fit, not only the possibility of breakage due to the unsupported areas is minimized but also, the sound due to the flushing of the toilet is materially reduced with the materials used in the seat and lid structure of this invention.

For the purpose of describing the particular construction of the invention, the drawings illustrate the method and apparatus used in forming seat 1, but it is to be understood that the lid 2 is constructed in substantially the identical manner.

Figure 8:
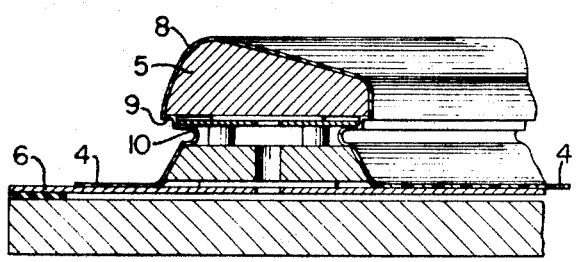
Figure 10:
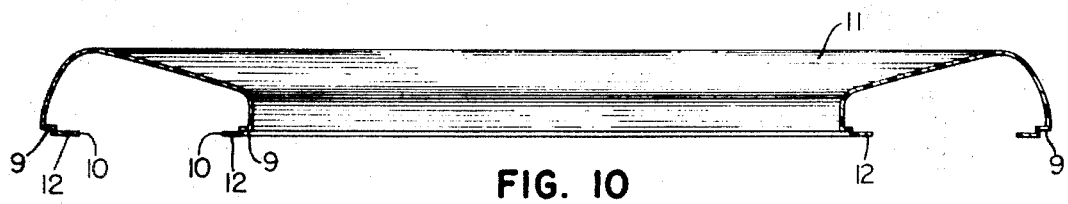
FIG. 10 is a cross-section of a portion of the seat.

To form seat 1, initially a blank 4 of a relatively thin, flexible skin of impervious material is placed over a forming mold 5 which, as shown, is positioned on a vacuum surface plate 6 in a manner so that the vacuum will withdraw the air between the mold 5 and skin 4. Preferably prior to placing skin 4 over mold 5, the blank of skin material 4 is heated to make it very pliable and flexible. When a vacuum is supplied from a source not shown to the vacuum surface 6 through opening 7, the air lying between skin 4 and mold 5 is evacuated, to draw the skin tightly around mold 5 as seen in FIG. 8. The particular cross-sectional configuration of mold 5 may be of any desired shape and that shown in the drawings is only illustrative of one such configuration. Preferably the cross-sectional contour is generally plano-convex. The skin 4 is formed tightly over the contoured section 8 of mold 5 and in the notched lower corner portions around the periphery to form recesses 9 in the formed skin. Preferably, prior to removing from the mold, the skin 4 is cooled sufficiently so as to retain its shape, then the skin 4 is severed with a sharp instrument such as a knife at point 10 so that the formed skin 11 after removal from the mold is of a configuration such as seen in FIG. 10. The severing of the skin 4 at 10 to remove the excess which lies inwardly from the edges of recesses 9, leaves a short section 12 of the skin extending inwardly which, as will be explained subsequently, functions as a seal against the mold surface.

Figure 9:
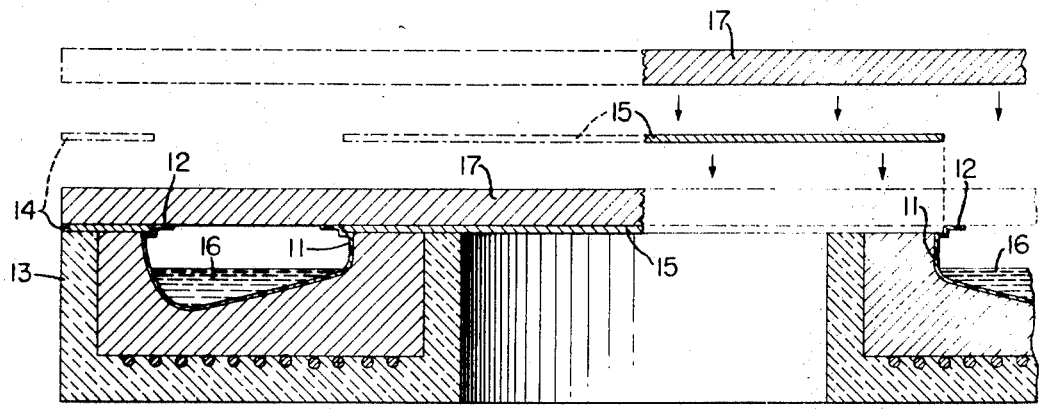
Figure 3:
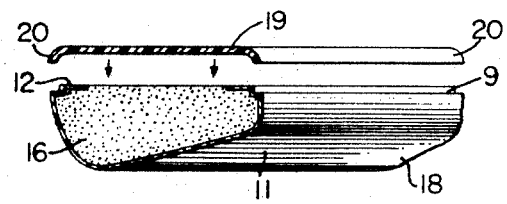
FIG. 3 is a detail section of the seat illustrating the assembly of parts to form the finished structure.

As seen in FIG. 9 the formed and shaped skin 11 is then inverted and placed in a supporting mold structure 13 having a cavity of similar configuration to that of the formed skin. Back-up rings 14 and 15 conforming to the periphery of the recesses 9 are then placed in position to back up and retain the formed configuration of recesses 9. A predetermined amount or charge of foam material 16 is placed in the skin and then the top plate 17 of the mold is placed over the mold. As seen best in FIG. 3 the material 16 then foams to fill the interior of the formed skin to form the top portion 18 of seat 1. As the foam material 16 expands to fill the mold 13 and formed skin 11, the foam rises under the sections 12 of skin 11 to push them tightly against top plate 17. This creates a seal between sections 12 and plate 17 to eliminate any flow of the foam 16 beyond the cavity of skin 11 so that no trimming or other removal of foam overflow is necessary.

To complete the seat structure a bottom portion 19 (FIG. 3) preferably of a semi-rigid, resilient non-metallic material is formed with upturned edges 20 which interfit recesses 9 in top portion 18. Bottom portion 19 is sufficiently rigid so as to retain its generally planar form except when subjected to substantial deflecting loads. Bottom portion 19 may be vacuum formed in an operation similar to that described for that of the skin, with upturned edges 20 trimmed after forming to a substantially uniform height so as to accurately fit recesses 9 of top portion 18. Top portion 18 and bottom portion 19 are assembled and may be secured to each other, for example by means of adhesives applied to the mating surfaces or may be electronically sealed at the adjoining edges to provide an integral assembled structure.

Lid 2 is made in essentially the same manner by vacuum forming the skin 21 with a recess 22 around the outer periphery to receive the upturned edges 23 of the vacuum formed semi-rigid, resilient bottom 24. The formed skin 21 is filled with cushioning material 25 by foaming it in place in formed skin 21 to form the top portion 26 of the lid 2. The bottom 24 and top portion 26 are then assembled and secured together to form an integral structure.

The seat 1 and lid 2 are hinged together to provide the well-known selective movements with respect to each other and with respect to the toilet bowl. This may be accomplished in many ways but preferably the hinging should be as inconspicuous as possible so as to be pleasing in appearance and blend in well with the seat and lid. A satisfactory means of joining seat 1 and lid 2 along the rear marginal portions to accomplish the foregoing is illustrated.

In the seat 1 as seen in FIG. 5, a metal stamping 27 with upturned ears 28 adjacent the edges of notch 29 in the rear edge of seat 1 is integrally incorporated as a part of seat 1 by positioning, after coating both sides with an adhesive, in top portion 18 prior to assembly with bottom portion 19. Preferably a recess to receive stamping 27 is formed by the mold in the foam material to receive the stamping 27 for accurate positioning thereof. A tubular member 30 is coated with adhesive and dropped in position in the vacuum formed projection or boss 31 of lid 2 and interleaves between the ears 28 of the stamping 27 in the seat 1.

In assembling the lid and seat portion, a pair of members 32 having means 33 for attaching to the bowl as well as a sleeve 34 to receive the pin 35 are positioned on each side of projection 31 of lid 2 and then pin 35 is inserted through the sleeves 34 and tubular member 30. One end of pin 35 is then inserted in opening 36 in one ear 28 of stamping 27 by distorting temporarily the foam portion of one side of seat 1 immediately adjacent one of the ears 28 while pin 35 is being inserted. Upon release the material assumes its original shape and retains the pin in position unless it is necessary to remove by reversing the procedure. The other end of pin 35 is inserted similarly in opening 36 in the other ear 28 of stamping 27.

By forming the skin with a portion extending inwardly such as 12 or 39 from the periphery of the skin so as to overlay the upper peripheral edge of the cavity portion of the formed skin, a very effective seal against overflow of the cushioning material from the interior of the skin beyond the desired position is provided. Following the setting or vulcanization of the foam, the skin and foamed material assembly is then removed from the mold and requires little, if any, trimming prior to use.

This feature of the invention is shown in FIG. 11, in which a vacuum formed skin 37 is filled with foam 38 as skin 37 is supported in a mold as previously described. Skin 37 has formed around its periphery, an inwardly extending flap or portion 39 which creates a seal against the mold lid as the foaming takes place so as to confine foam 38 entirely within the formed skin 37 without any substantial overflow. For purposes of illustration, a bottom support 40 is attached to the foam filled skin 37 to complete the item. A structure such as this provides a very economical and practical item such as a chair seat or back which need only be attached to the chair frame.

There are numerous and varied materials which are available and suitable for use as the substantially impervious skin and bottom portions of the cushioned structure of this invention. The material must be formable into a chest and broadly speaking any organic plastic material that can be molded or cast with or without a filler may be used. For example, any resinous material made by polymerizing monomers will find use as the shell portion of the structure of this invention such as those made from monomers containing a polymerizable group such as a vinyl ketone, a vinyl ester, a vinyl ether, an acrylonitrile, a vinyle halide, a butadiene, a diene, and a vinyl acetylene. Specifically the following resinous materials may be used including cellulose esters and others, such as cellulose acetate, cellulose nitrate, ethyl cellulose, benzyl cellulose, cellulose acetopropionate, cellulose acetobutyrate, the vinyl plastics such as plastics derived from vinyl esters such as vinyl chloride, vinyl acetate, vinyl chloroacetate, vinyl propionate, polyvinyl acetal, polyvinyl butyral; the vinylidene plastics such as polymerized vinylidene esters and derivatives, for example, vinylidene chloride, vinylidene acetate; styrene polymers such as polystyrene, polymethylstyrene and copolymers of styrene with methylstyrene; the acrylic plastics such as polymers resulting from the polymerization of the methacrylates and/or derivatives of methacrylic acid, for example, methylmethacrylate, ethyl methacrylate, methacrylate and acrylonitrile; the hydrocarbon polymers resulting from the polymerization of isobutylene and similar hydrocarbon monomers and polymers resulting from the polymerization of ethylene and vinyl alcohol as well as the alkyd resins, ester gum, rosin esters, the polyamides and the polyesters.

Also, the impact resistant polymers known as graft polymers may be used in this invention particularly graft polymers of the type disclosed in U.S. Pat. 3,118,854 where blends of a rubbery graft copolymer and a resinous polymer may be employed. More specifically the rubbery graft copolymer may be one wherein the polymer results from the polymerization of a mixture of monomers comprising styrene and acrylonitrile polymerized in the presence of a copolymer resulting from a mixture comprising a major portion of a diene hydrocarbon and a minor portion of a monomer copolymerizable therewith, particularly acrylonitrile. The rubbery graft copolymer may be reinforced with a resinous polymer such as those resulting from the polymerization of vinyl chloride, styrene, acrylonitrile or a copolymer of styrene and acrylonitrile. The rigidity of a sheet of this material made from a blend of a rubbery graft copolymer of the type described with a resinous polymer of the nature described above will depend upon the ratio of graft polymer to resinous polymer being employed. A more flexible sheet results where more rubbery graft polymer is used than resinous polymer from 1:1 up to a ratio of 8:1. A stiffer sheet is produced when a major portion of the blend is made of the resinous polymer wherein the ratio of rubbery graft copolymer to resinous polymer extends from 1:1 to 1:8. Other representative graft polymers may be those shown in U.S. Pats. 3,073,798; 2,802,808; 2,802,809; 2,861,974; 2,851,448; 2,820,773 and 2,754,282.

The cushioning material preferably is any of the polyurethane foamable reaction mixtures but other resilient materials such as foamed latex may be used if desired. Representative examples of the reactive hydrogen containing polymeric materials which may be reacted with polyisocyanates to produce foamable liquid reaction mixtures are: polyester polyols, polyether polyols, hydrocarbon polyols and polyester amides. Normally, these materials will have a molecular weight of about 700 to about 5000 with the preferred molecular weight range being about 1500 to 3000. Representative members of the polyester polyols are those condensation products of a polycarboxylic acid or its anhydride with a monomeric polyol such as ethylene glycol, propylene glycol, trimethyl propane and glycerine.

Representative examples of the polycarboxylic acids are adipic, phthalic, terephthalic and isophthalic acids. Representative examples of the polyether polyols are polypropylene ether glycol, poly tetramethylene ether gycol and the condensation products obtained by condensing alkylene oxides having from 2 to 10 carbon atoms on a nucleus generating compound, where the nucleus generating compound may be an acid such as the above-named carboxylic acids and a polyol such as the above-named polyols.

Representative members of the many polyisocyanates useful for making polyurethane foamable reaction mixtures are toluene diisocyanate, toluidine diisocyanate, naphthylene diisocyanate, diphenyl methane diisocyanate and the phosgenated product obtained by treating the reaction product of an aldehyde or ketone with aniline and then phosgenating. Other isocyanates are hexamethylene diisocyanate and the related aliphatic and cyclo aliphatic polyisocyanates.

Normally the reactive hydrogen containing material such as the polypropylene ether polyol is reacted with a molar excess of an organic diisocyanate with the preferred range being about 1.1 to about 1.5 mols of isocyanate for each mol of reactive hydrogen containing material. Suitable catalysts of the amine type and emulsifying agents of the silicone type together with water are added to produce the polyurethane foamable reaction mixture either by the prepolymer or one step methods. Also, it is desirable and preferred to use a small amount from about 2 to 20% of a liquid low boiling foaming agent to facilitate the blowing of the liquid foamable polyurethane reaction mixture. Suitable low boiling foaming agents are the fluorinated hydrocarbons, halogenated hydrocarbons and the low boiling hydrocarbons. A typical liquid foamable reaction mixture is as follows:

(1) 100 parts of a polypropylene ether glycol of about 1500 to 3000 molecular weight;
(2) 100 parts of a polypropylene ether triol of about 1500 to 3000 molecular weight;
(3) approximately 10 parts of trichlorofluoro methane;
(4) 84 to 88 parts of toluene diisocyanate (80/20 isomer);
(5) 5.6 parts water;
(6) 0.4 part stannous octate;
(7) 0.4 part of triethylene diamine;
(8) 0.4–.8 part of an N-ethyl morpholine;
(9) 4–6 parts of a silicone which contains blocked polymeric groups of the polyoxy ethylene and the polyoxy propylene types.

The foregoing descriptions of the materials are illustrative of ones suitable for this invention and as such may include other materials to provide for increased retardation of bacterial and fungus growth as well as elimination of skin irritation that might be normally present. Coloring and other decorative materials may be incorporated also to enable almost unlimited effects.

While certain representative embodiments and details have been shown for the purpose of illustrating the invention, it will be apparent to those skilled in the art that various changes and modifications may be made therein without departing from the spirit or scope of the invention.

I claim:
1. A resilient cushioning assembly comprising a cover of formed skin of a flexible impervious material to provide an open bottom chamber to receive the resilient cushioning material with a flap portion extending inwardly a short distance around the periphery of the open bottom and a foamed resilient cushioning material filling said chamber and adhered to said skin with the foamed material underlying said flap portion whereby the foamed material is confined within the formed skin with no substantial overflow of foamed material around the peripheral edges of said chamber, and may be assembled into a structure as a unit.

2. A cushioned toilet seat comprising a base formed of a semi-rigid resilient, pliable, non-metallic material having the peripheral edges upturned and extending a substantially uniform distance above the surface of the base, a cushion member of a resilient cushioning material having a flexible, fluid-impervious skin thereon with a portion thereof extending inwardly a short distance over the bottom surface of the cushion member from the lower peripheral corners, the cushion member being co-extensive with said base and having a notch formed in the lower peripheral corners thereof into which the upturned edges of said base interfit to form a substantially continuous exterior surface on the seat.

3. A cushioned toilet seat assembly for attachment to a toilet bowl including a supporting base and a cushion element superposed thereon, said base comprising a substantially flat sheet of semi-rigid, resilient material of a configuration comparable to that of said toilet bowl and having the peripheral edge portions turned up to extend a distance above the surface of the base, said cushion element comprising a core of resilient, soft, deformable material, with a skin of fluid-impervious, flexible, sanitary material on the exposed surface thereof, said cushion element having a substantially flat bottom surface with a portion of the skin extending inwardly a short distance thereon and a generally arcuate exposed surface, with a recess foamed at the juncture of the flat and arcuate surfaces of a depth substantially equal to the height of the upturned edges of the base and adapted to receive the upturned edge of the base whereby the adjacent surfaces of the cushion element and base are substantially flush.

4. A cushioned toilet seat and cover unit for attachment to the toilet bowl, the seat and cover comprising a bottom portion having a configuration substantially similar to that of the toilet bowl and formed of a semi-rigid, resilient material with the peripheral edges turned upwardly and extending a substantially uniform distance above the surface of said bottom portion, a top portion generally plano-convex in cross-section of a resilient cushioning material having a flexible, impervious, unbroken covering over the convex surface and adhered thereto with a flap portion extending inwardly a short distance over the plane surface at the juncture of the convex and plane surfaces, said juncture being recessed to receive the upturned edges of the bottom portion and form a substantially unbroken surface when the top and bottom portions are inseparably assembled, with the planar face positioned on the bottom portion, attachment means incorporated in said seat for attaching the seat to the toilet bowl, and hinge means joining said seat and cover for selective independent movement.

References Cited

UNITED STATES PATENTS

| | | | |
|---|---|---|---|
| 2,450,209 | 9/1948 | Sperzel | 4—236 |
| 2,493,362 | 1/1950 | Rocker | 4—237 |
| 2,771,612 | 11/1956 | Samuels | 4—237 |
| 2,899,689 | 8/1959 | Pastl | 4—237 |
| 3,120,570 | 2/1964 | Kennedy et al. | 264—45 |
| 3,155,751 | 11/1964 | Morris | 264—45 |
| 3,210,782 | 10/1965 | Buist et al. | 264—45 XR |
| 3,221,085 | 11/1965 | Rill et al. | 264—45 |

FOREIGN PATENTS

| | | |
|---|---|---|
| 772,024 | 4/1957 | Great Britain. |

LAVERNE D. GEIGER, Primary Examiner

H. K. ARTIS, Assistant Examiner

U.S. Cl. XR.

4—113